(12) United States Patent
Richey et al.

(10) Patent No.: US 12,212,886 B2
(45) Date of Patent: Jan. 28, 2025

(54) REPLICATING A DIGITAL ENVIRONMENT

(71) Applicant: Lenovo (Singapore) Pte. Ltd., New Tech Park (SG)

(72) Inventors: Allen Richey, Frisco, TX (US); Inna Zolin, Cary, NC (US); Matthew Fardig, Boonville, IN (US)

(73) Assignee: Lenovo (Singapore) Pte. Ltd., New Tech Park, Singapore (SG)

( * ) Notice: Subject to any disclaimer, the term of this patent is extended or adjusted under 35 U.S.C. 154(b) by 63 days.

(21) Appl. No.: 17/854,481

(22) Filed: Jun. 30, 2022

(65) Prior Publication Data
US 2024/0007589 A1  Jan. 4, 2024

(51) Int. Cl.
| | |
|---|---|
| H04N 5/91 | (2006.01) |
| G11B 27/00 | (2006.01) |
| G11B 27/10 | (2006.01) |
| G06T 7/12 | (2017.01) |
| G06T 7/162 | (2017.01) |
| H04N 5/76 | (2006.01) |

(52) U.S. Cl.
CPC .............. *H04N 5/91* (2013.01); *G11B 27/10* (2013.01)

(58) Field of Classification Search
CPC . H04N 5/91; H04N 5/76; G11B 27/10; G11B 27/00; G06T 7/12; G06T 7/162
USPC ......................................... 386/282, 278, 239
See application file for complete search history.

(56) References Cited

U.S. PATENT DOCUMENTS

2016/0234268 A1*  8/2016  Ouyang .................. H04L 67/54

* cited by examiner

*Primary Examiner* — Daquan Zhao
(74) *Attorney, Agent, or Firm* — Kunzler Bean & Adamson

(57) ABSTRACT

Apparatus, methods, and computer program products that can replicate a digital environment are disclosed. One apparatus includes a processor and a memory that stores code executable by the processor to generate a digital record of a digital environment occurring at an original time in which the digital record includes a set of happenings that occurred in the digital environment at the original time. The code is further executable by the processor to store the digital record for replication of the digital environment. Methods and computer program products that include and/or perform the operations and/or functions of the apparatus are also disclosed.

20 Claims, 11 Drawing Sheets

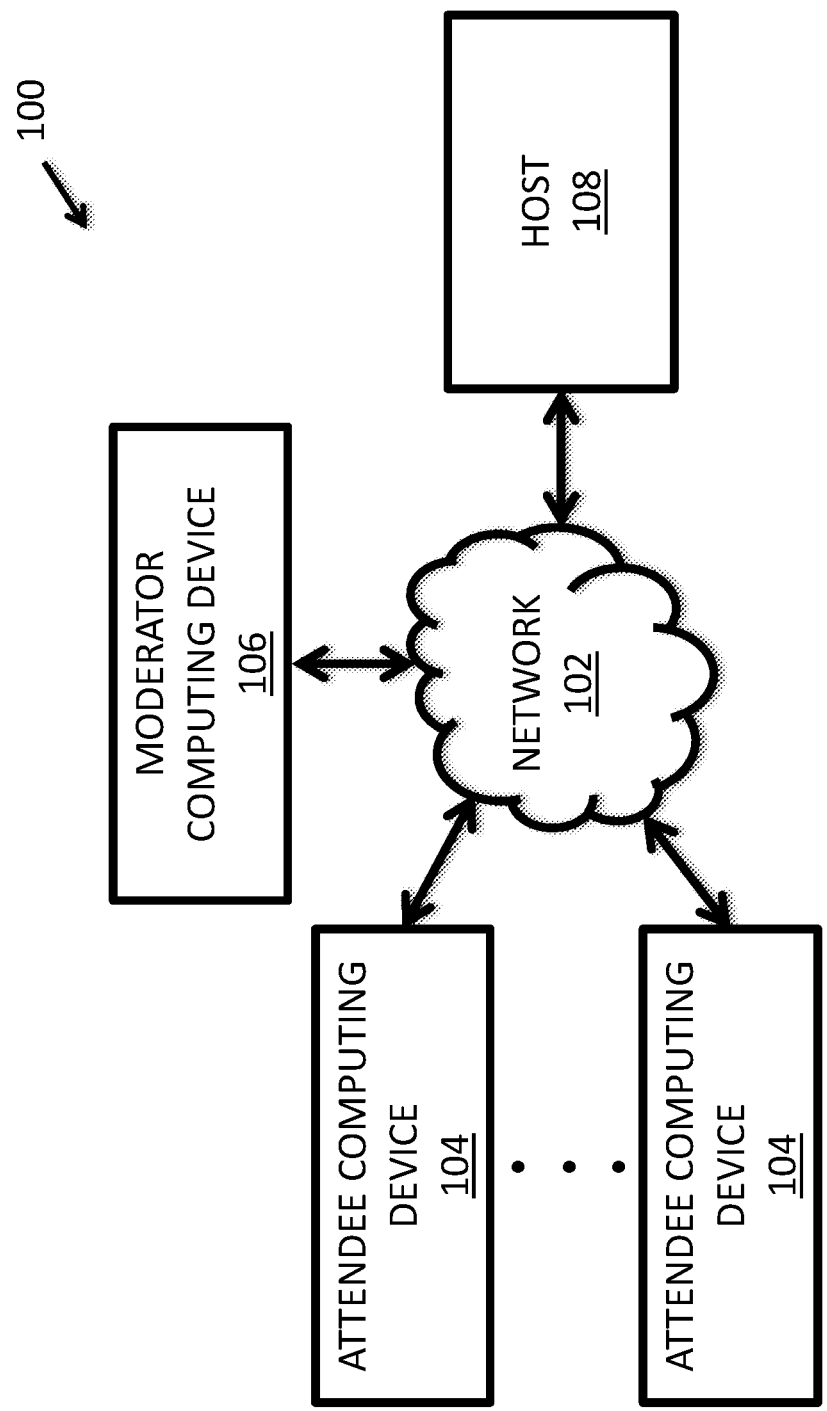

REPLICATING A DIGITAL ENVIRONMENT

FIELD

The subject matter disclosed herein relates to digital environments and more particularly relates to apparatus, methods, and program products for replicating a digital environment.

DESCRIPTION OF THE RELATED ART

Modern school and work environments have increased the use of digital environments (e.g., virtual classrooms, virtual work meetings, etc.) that allow the users to virtually and/or remotely participate in a digital environment. In some cases, an individual may have missed the digital environment or an individual that participated in the digital environment may desire to replay and/or review a digital environment. Currently, in replaying and/or reviewing a digital environment, the user is only able to replay and/or review an audiovisual recording of the digital environment.

BRIEF SUMMARY

Apparatus that can replicate a digital environment are disclosed. One apparatus includes a processor and a memory that stores code executable by the processor. The code is executable by the processor to generate a digital record of a digital environment occurring at an original time, the digital record comprising a set of happenings that occurred in the digital environment at the original time and store the digital record for replication of the digital environment.

Also disclosed are methods for replicating a digital environment. One method includes generating, by a processor, a digital record of a digital environment occurring at an original time, the digital record comprising a set of happenings that occurred in the digital environment at the original time and storing the digital record for replication of the digital environment.

Computer program products including a computer-readable storage device including code embodied therewith are further disclosed herein. The code is executable by a processor and causes the processor to replicate a digital environment. The executable code further causes the processor to generate a digital record of a digital environment occurring at an original time, the digital record comprising a set of happenings that occurred in the digital environment at the original time and store the digital record for replication of the digital environment.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 1 is a schematic block diagram of one embodiment of a computing system that can replicate a digital learning environment;

DETAILED DESCRIPTION

Figure 2A:
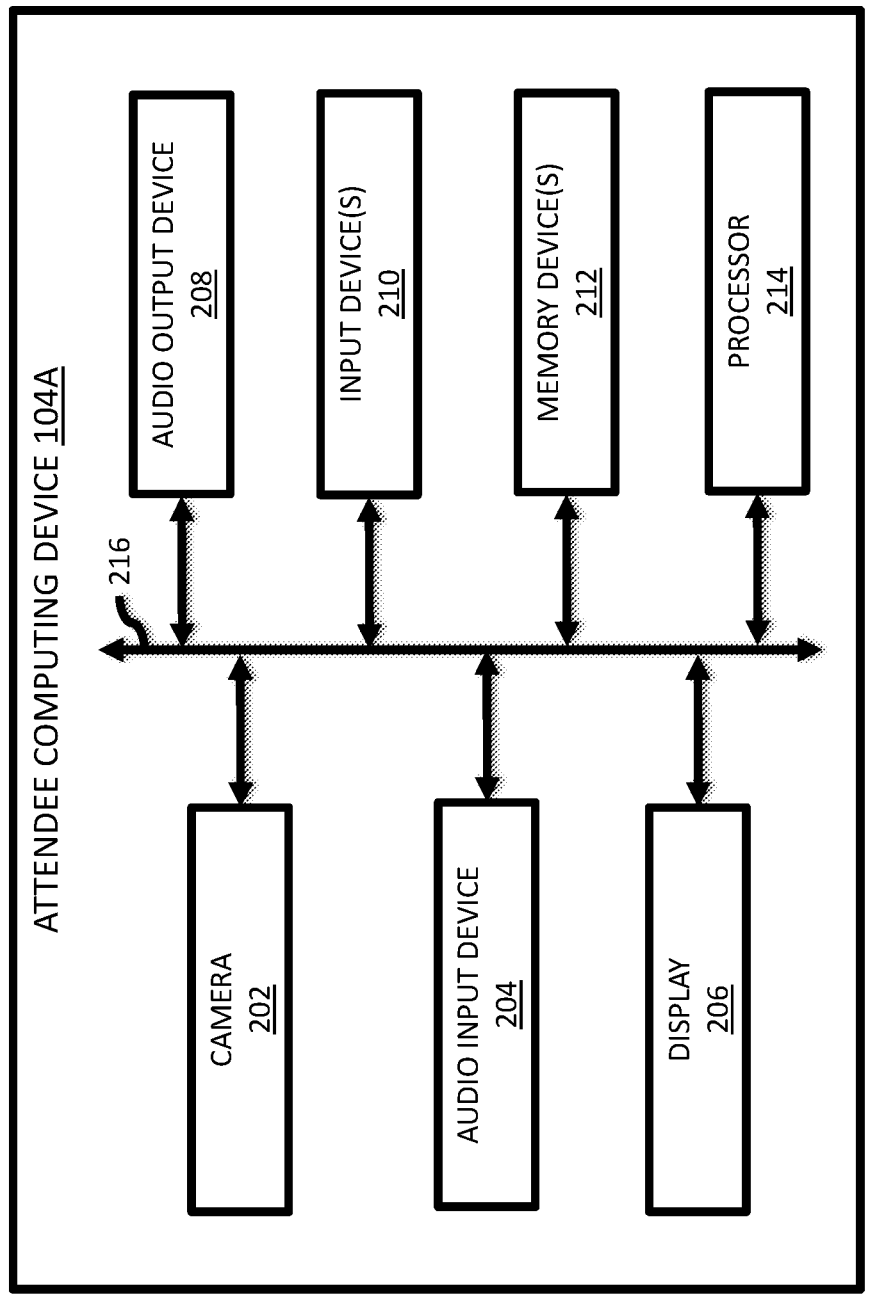
FIGS. 2A and 2B are schematic block diagrams of various embodiments of an attendee computing device included in the computing system of FIG. 1.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a circuit, module, or system. Furthermore, embodiments may take the form of a program product embodied in one or more computer-readable storage devices storing machine readable code, computer-readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together and may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer-readable storage devices. Where a module or portions of a module are implemented in software, the software portions are stored on one or more computer-readable storage devices.

Any combination of one or more computer-readable media may be utilized. The computer-readable medium/media may include one or more computer-readable storage media. The computer-readable storage medium/media may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (e.g., a non-exhaustive and/or non-limiting list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the C programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to one embodiment, an embodiment, or similar language means that a particular feature, structure, or characteristic described in connection with the embodiment is included in at least one embodiment. Thus, appearances of the phrases in one embodiment, in an embodiment, and similar language throughout this specification may, but do not necessarily, all refer to the same embodiment, but mean one or more but not all embodiments unless expressly specified otherwise. The terms including, comprising, having, and variations thereof mean including but not limited to, unless expressly specified otherwise. An enumerated listing of items does not imply that any or all of the items are mutually exclusive, unless expressly specified otherwise. The terms, "a," "an," and "the," also refer to one or more unless expressly specified otherwise.

In addition, as used herein, the term, "set," can mean one or more, unless expressly specified otherwise. The term, "sets," can mean multiples of or a plurality of one or mores, ones or more, and/or ones or mores consistent with set theory, unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatus, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

With reference to the drawings, FIG. 1 is a schematic block diagram of one embodiment of a computing system 100 (and/or computing network 100) that can learn, identify, and launch operations in a digital learning environment. At least in the illustrated embodiment, the computing system 100 includes, among other components, a network 102 connecting a set of one or more attendee computing devices 104 (also simply referred individually, in various groups, or collectively as attendee computing device(s) 104), a moderator computing device 106, and a host computing device 108 and/or host computing system 108 (or simply, host 108), and to one another.

The network 102 may include any suitable wired and/or wireless network 102 (e.g., public and/or private computer networks in any number and/or configuration (e.g., the Internet, an intranet, a cloud network, etc.)) that is known or developed in the future that enables the set of attendee computing devices 104, the host 108, and the moderator computing device 106 to be coupled to and/or in communication with one another and/or to share resources. In various embodiments, the network 102 can comprise the Internet, a cloud network (IAN), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of communicating (e.g., digital learning environment) with one another that are possible and contemplated herein.

An attendee computing device 104 may include any suitable computing system and/or computing device capable of accessing and/or communicating with one another, the moderator computing device 106, and the host 108 the via the network 102. Examples of an attendee computing device 104 include, but are not limited to, a laptop computer, a desktop computer, a personal digital assistant (PDA), a tablet computer, a smart phone, a cellular telephone, a smart television (e.g., televisions connected to the Internet), a wearable, an Internet of Things (IoT) device, a game console, a vehicle on-board computer, a streaming device, a smart device, and a digital assistant, etc., among other computing devices that are possible and contemplated herein.

System 100 may include any suitable quantity of attendee computing devices 104. That is, while system 100 is illustrated in FIG. 1 as including two (2) attendee computing devices 104, the various embodiments are not limited to two attendee computing devices 104. In other words, various other embodiments of the system 100 may include one (1) attendee computing device 104 or any quantity of attendee computing devices 104 greater than two attendee computing devices 104.

With reference to FIG. 2A, FIG. 2A is a block diagram of one embodiment of an attendee computing device 104A. At least in the illustrated embodiment, the attendee computing device 104A includes, among other components, a camera 202, an audio input device 204, a display 206, an audio output device 208, one or more input devices 210, one or more memory devices 212, and a processor 214 coupled to and/or in communication with one another via a bus 216 (e.g., a wired and/or wireless bus).

A camera 202 may include any suitable device that is known or developed in the future capable of capturing and transmitting images, video feeds, and/or video streams. In various embodiments, the camera 202 includes at least one video camera.

An audio input device 204 may include any suitable device that is known or developed in the future capable of capturing and transmitting audio/sound, audio feeds, and/or audio streams. In various embodiments, the audio input device 204 includes at least one microphone.

A display 206 may include any suitable device that is known or developed in the future capable of displaying images/data, video/data feeds, and/or video/data streams. In various embodiments, the display 206 may include an internal display or an external display. In some embodiments, the display 206 is configured to display a video/data feed of the attendees (e.g., students, workers, adults, children, colleagues, etc.) and/or the moderator (e.g., an adult, a teacher, a boss, an individual in charge, etc.) of a digital learning environment (e.g., a virtual learning system, a virtual learning platform, virtual learning application/software, a classroom management system, a classroom management platform, classroom management software/application, online learning system, online learning platform, online learning application/software, a distance learning system, a distance learning platform, distance learning application/software, a video conference system, a video conference platform, digital learning environment application/software, a virtual classroom, a virtual meeting, etc., and/or the like digital learning environments or digital environments) while the digital learning environment is in progress.

An audio output device 208 may include any suitable device that is known or developed in the future capable of receiving and providing audio/sound, audio feeds, and/or audio streams. In various embodiments, the audio output device 208 includes a speaker, a set of headphones, and/or a set of earbuds, etc., among other suitable audio output devices that are possible and contemplated herein.

An input device 210 may include any suitable device that is known or developed in the future capable of receiving user input. In various embodiments, the output device 210 includes a keyboard, a mouse, a trackball, a joystick, a touchpad, and/or a touchscreen, etc., among other suitable input devices that are possible and contemplated herein.

A set of memory devices 212 may include any suitable quantity of memory devices 212. Further, a memory device 212 may include any suitable type of device and/or system that is known or developed in the future that can store computer-useable and/or computer-readable code. In various embodiments, a memory device 212 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 214).

A memory device 212, in some embodiments, includes volatile computer storage media. For example, a memory device 212 may include random access memory (RAM), including dynamic RAM (DRAM), synchronous dynamic RAM (SDRAM), and/or static RAM (SRAM). In other embodiments, a memory device 212 includes non-volatile computer storage media. For example, a memory device 212 may include a hard disk drive, a flash memory, and/or any other suitable non-volatile computer storage device that is known or developed in the future. In various embodiments, a memory device 212 includes both volatile and non-volatile computer storage media.

Figure 3:
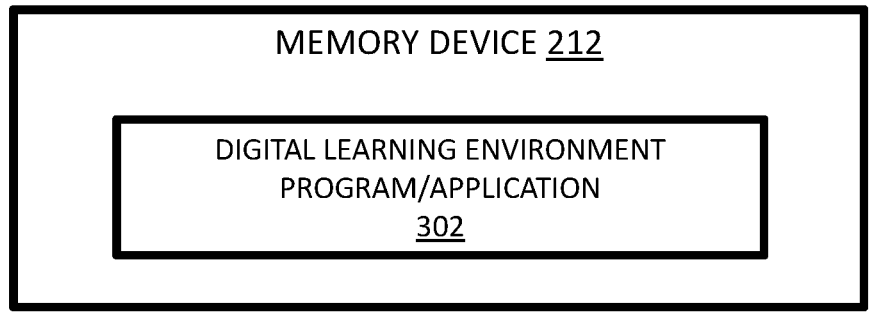
FIG. 3 is a schematic block diagram of one embodiment of a memory device included in the attendee computing devices of FIGS. 2A and 2B.

With reference now to FIG. 3, FIG. 3 is a schematic block diagram of one embodiment of a memory device 212A. At least in the illustrated embodiment, the memory device 212A includes, among other components, a digital learning environment program and/or application 302, that is configured to operate/function when executed by the processor 214.

A digital learning environment program/application 302 may include any suitable commercial and/or private digital learning environment program and/or application that is known or developed in the future. Examples of a digital learning environment program/application 302 include, but are not limited to, LanSchool®, Google Classroom™, Blackboard®, Microsoft Teams®, Zoom®, Google Meet®, Cisco Webex®, GoToMeeting®, Skype®, etc., and/or the like digital learning environment programs/applications, each of which is contemplated herein. In some embodiments, the digital learning environment program/application 302 can include an enterprise and/or proprietary digital learning environment program and/or application.

In various embodiments, a digital learning environment program/application 302 is configured to utilize the camera 202 and the audio input device 204 to capture one or more images and one or more audios/sounds, respectively, and generate a video feed and/or video stream that includes the captured image(s) and audio(s)/sound(s) (e.g., of a user). The video feed and/or video stream that includes the captured image(s) and audio(s)/sound(s) of the user can include the behavior(s) (e.g., voice, gestures, etc.) of the user in real-time during the digital learning environment. The digital learning environment program/application 302, in some embodiments, is further configured to transmit the video feed and/or video stream to one or more other attendee computing devices 104, the moderator computing device 106 (e.g., used by a teacher, supervisor, colleague, etc.), and the host 108.

In various embodiments, the digital learning environment program/application 302 is further configured to receive video feeds and/or video streams from one or more other attendee computing devices 104 and/or the moderator computing device 106. The digital learning environment program/application 302 is also configured to utilize the display 206 and the audio output device 208 to display the image(s) and play the audio(s)/sound(s), respectively, in the received video feed and/or video stream (e.g., to a user).

The user behavior(s) captured by the camera 202 and/or input device 204, at various times, may include any suitable behavior(s) and/or interaction(s) that can occur in a digital learning environment. For example, the user behavior(s) may include the user literally and/or figuratively (e.g., electronically) raising their hand, asking a question, providing an answer, making a suggestion, and/or providing additional material(s)/information/resource(s), etc., among other behaviors and/or interactions that are possible and contemplated herein. In various embodiments, a set of one or more auditory cues and/or one or more visual cues can define the user's behavior(s) and/or interactions.

Auditory cues can include, but are not limited to, any type of word(s), sound(s), and/or noise(s), etc., whether generated by a human (e.g., analog cues) and/or by a non-human (e.g., digital cues via a computing device/machine, a mechanical device/machine, etc.). Visual cues can include, but are not limited to, any type of gesture(s), typed message (e.g., chat, instant message, private message, etc.), picture(s), video(s), and/or other visual representation(s), etc., whether generated by a human (e.g., analog cues) and/or a non-human (e.g., digital cues via a computing device/machine, a mechanical device/machine, etc.).

An attendee computing device 104 that generates and transmits a video feed and/or video stream that includes behavior exhibited by its user can be referred to herein as, a source attendee computing device 104. An attendee computing device 104 that receives and/or is used by an attendee that is the target of any behavior included in a video feed and/or video stream from one or more source attendee computing devices 104 can be referred to herein as, a target attendee computing device 104. The moderator computing device 106 and/or the user (e.g., the moderator) of the moderator computing device 106 can also be the target of the behavior included in a video feed and/or video stream from one or more source attendee computing devices 104.

Referring back to FIG. 2A, a processor 214 may include any suitable non-volatile/persistent hardware and/or software configured to perform and/or facilitate performing various processing functions and/or operations. In various embodiments, the processor 214 includes hardware and/or software for executing instructions in one or more digital learning environment modules and/or applications. The digital learning environment modules and/or applications executed by the processor 214 can be stored on and executed from a memory device 212 and/or from the processor 214.

Figure 4:
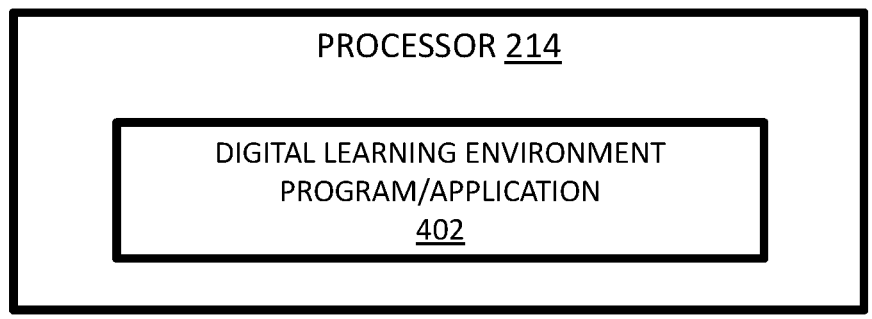
FIG. 4 is a schematic block diagrams of one embodiment of a processor included in the attendee computing devices of FIGS. 2A and 2B.

With reference to FIG. 4, FIG. 4 is a schematic block diagram of one embodiment of a processor 214. At least in the illustrated embodiment, the processor 214 includes, among other components, a digital learning environment program/application 402 similar to the digital learning environment program/application 302 in the memory device 212 discussed with reference to FIG. 3.

Figure 2B:
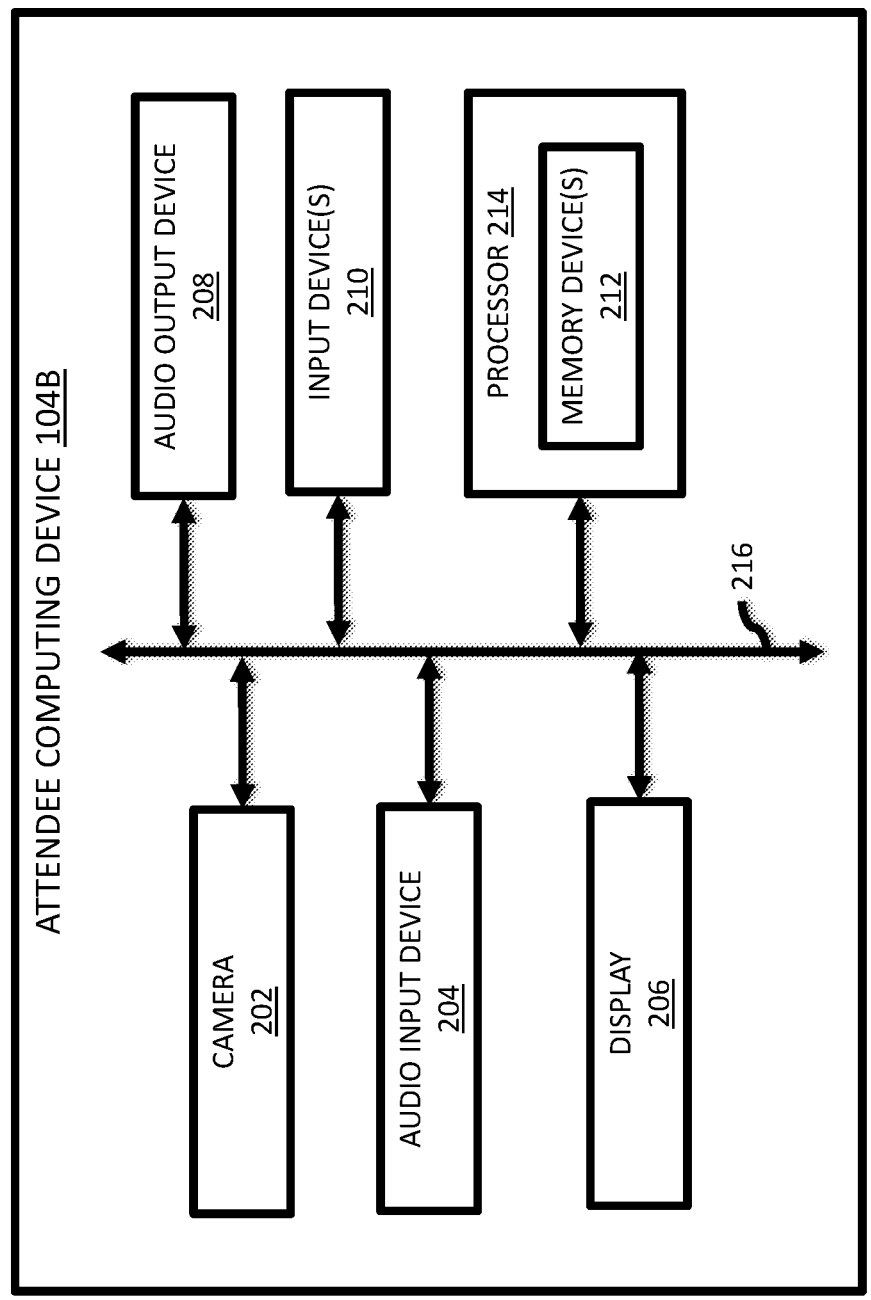

Referring to FIG. 2B, FIG. 2B is a block diagram of another embodiment of an attendee computing device 104B. The attendee computing device 104B includes, among other components, a camera 202, an audio input device 204, a display 206, an audio output device 208, one or more input devices 210, one or more memory devices 212, and a processor 214 coupled to and/or in communication with one another via a bus 216, similar to the camera 202, audio input device 204, display 206, audio output device 208, input device(s) 210, memory device(s) 212, processor 214, and bus 216 discussed with reference to the attendee computing devices 104A illustrated in FIG. 2A. Alternative to the attendee computing device 104A, the processor 214 in the attendee computing device 104B includes the memory device(s) 212 as opposed to the memory device(s) 212 of the attendee computing device 104A being a different device than and/or independent of the processor 214.

With reference again to FIG. 1, a moderator computing device 106 may include any suitable computing system and/or computing device capable of accessing and/or communicating with the attendee computing devices 104 and the host 108 via the network 102. Examples of a moderator computing device 106 include, but are not limited to, a laptop computer, a desktop computer, a PDA, a tablet computer, a smart phone, a cellular telephone, a smart television, a wearable, an IoT device, a game console, a vehicle on-board computer, a streaming device, a smart device, and a digital assistant, etc., among other computing devices that are possible and contemplated herein.

Figure 5A:
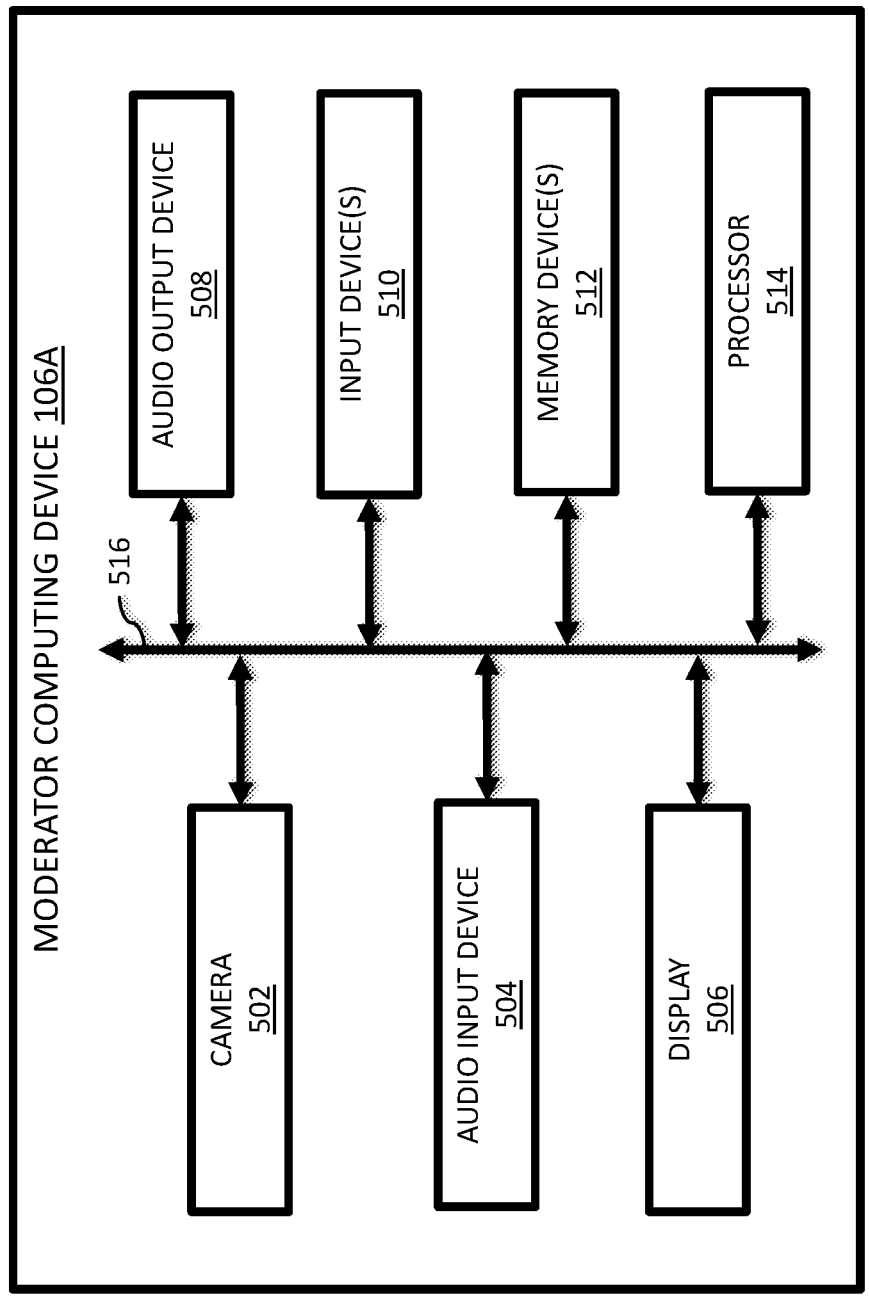
FIGS. 5A and 5B are schematic block diagrams of various embodiments of a moderator computing device included in the computing system (and/or computing device) of FIG. 1.

With reference to FIG. 5A, FIG. 5A is a block diagram of one embodiment of a moderator computing device 106A. The moderator computing device 106A includes, among other components, a camera 502, an audio input device 504, a display 506, an audio output device 508, and one or more input devices 510 coupled to and/or in communication with one another via a bus 516 (e.g., a wired and/or wireless bus), similar to the camera 202, audio input device 204, display 206, audio output device 208, input device(s) 210, and bus 216 discussed with reference to the attendee computing device 104A illustrated in FIG. 2A. At least in the illustrated embodiment, the moderator computing device 106A further includes, among other components, one or more memory devices 512 and a processor 514 coupled to an in communication with one another and with the camera 502, audio input device 504, display 506, audio output device 508, and input device(s) 510 via the bus 516.

A set of memory devices 512 may include any suitable quantity of memory devices 512. Further, a memory device 512 may include any suitable type of device and/or system that is known or developed in the future that can store computer-useable and/or computer-readable code. In various embodiments, a memory device 512 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 514).

A memory device 512, in some embodiments, includes volatile computer storage media. For example, a memory device 512 may include RAM, including DRAM, SDRAM, and/or SRAM. In other embodiments, a memory device 512 includes non-volatile computer storage media. For example, a memory device 512 may include a hard disk drive, a flash memory, and/or any other suitable non-volatile computer storage device that is known or developed in the future. In various embodiments, a memory device 512 includes both volatile and non-volatile computer storage media.

Figure 6:
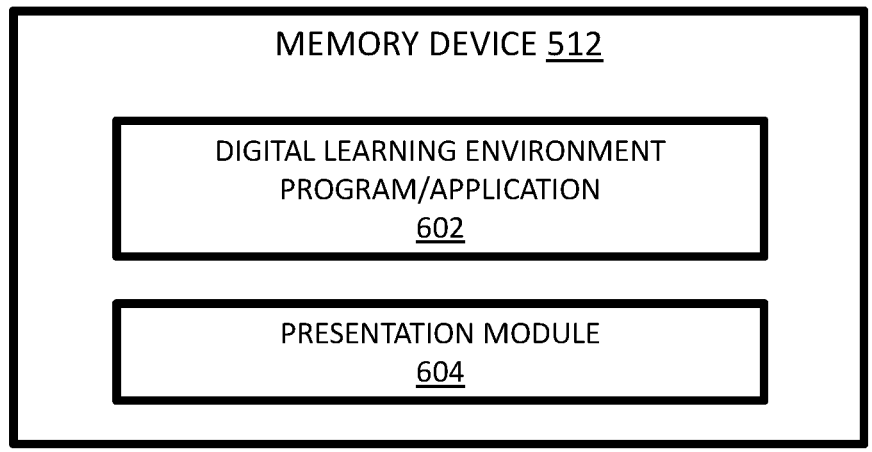
FIG. 6 is a schematic block diagram of one embodiment of a memory device included in the moderator computing devices of FIGS. 5A and 5B.

With reference now to FIG. 6, FIG. 6 is a schematic block diagram of one embodiment of a memory device 512. The memory device 512 includes, among other components, a digital learning environment program and/or application 602 similar to the digital learning environment program and/or applications 302 discussed elsewhere herein. At least in the illustrated embodiment, the memory device 512 further includes, among other components, a presentation module 604 that is configured to operate/function when executed by the processor 514.

A presentation module 604 may include any suitable hardware and/or software than can receive and/or store data, information, and/or resource(s). In various embodiments, the data, information, and/or resource(s) in the presentation module 604 define one or more presentations for the user of the moderator computing device 106.

A presentation can include any suitable type or presentation and/or presentation that is known or developed in the future. In various embodiments, a presentation can include instruction in a business, government, religious, and/or educational institution.

The presentation may include any suitable material, format, and/or resources that are known or developed in the future. For example, the presentation can include one or more digital slides, one or more videos, one or more audio-visual feeds, one or more digital handouts, one or more one websites and/or web addresses, and/or one or more links to one or more websites/web addresses, etc., among other materials and/or resources that are possible and contemplated herein.

In some embodiments, each separate type of material or item of material, type of format or item of format, and/or type of resource or item of resource can define an operation for a presentation. In additional or alternative embodiments, an operation can include any suitable transition and/or mechanism that can assist in the flow of a presentation. For example, an operation can include one or more visual cues (e.g., a chat, a text, a blank screen, a picture, video, color, highlight, etc.) and/or one or more auditory cues (e.g., a sound or silence, music, a volume, etc.), among other mechanisms that can assist in the flow of a presentation.

In still further additional or alternative embodiments, an operation can include an event. For example, an operation can include one or more time or timing elements (e.g., a beginning time, an intermission, a break, a transition time, and/or an ending time, etc.).

A presentation, in various embodiments, can include a set of one or more operations that the moderator/instructor intends to follow in presenting the material and/or resource(s) to the attendee(s)/student(s). In some embodiments, the set of operations include a predetermined and/or predefined order (e.g., sequential order) that the material and/or resource(s) are to be presented to the attendees (e.g., via the attendee computing device(s) 104. In additional or alternative embodiments, the set of operations define a flow for a presentation.

In certain embodiments, the presentation can include a lesson plan for an instructor or teacher. In a non-limiting example, a lesson plan can include, among other operations and/or elements, 1) turning ON a blank screen for each attendee computing device 104; 2) waiting an amount of time; 3) turning OFF the blank screen for each attendee computing device 104; 4) performing operations (e.g., click(s)) for website pushing to each attendee computing device 104 (e.g., specifying and submitting the web address or Uniform Resource Locator (URL) of a particular pushed website, performing (e.g., click) web limiting configuration options for the website, switching the web limiting configuration options to "Allow Only", adding the particular website to a list of websites, ensuring that the particular website is active, and turning OFF the other websites in the list of websites); 5) turning ON web limiting functions/operations; 6) lecture and/or open discussion; 7) generate (e.g., type (e.g., (chat, text, etc.), and/or verbal) and transmit instructions and/or information to attendee computing device(s) 104; 8) waiting an amount (predetermined) of time (e.g., 30 minutes or other suitable amount of time); and 9) turning OFF web limiting, among other operations and/or elements that are possible and contemplated herein.

In some embodiments, the moderator/instructor manually performs the operations of a presentation (e.g., lesson plan). In additional or alternative embodiments, the operations of a presentation (e.g., lesson plan) are automatically and/or automatedly performed.

At times, the moderator/instructor may modify a presentation in real time and/or on-the-fly modify by supplementing the presentation with one or more additional operations, materials, and/or resources to the presentation and/or subtracting one or more operations, materials, and/or resources from the presentation. The various embodiments discussed herein enable and/or allow for manual, automatic, and/or automation of these operations.

In certain embodiments, the moderator/instructor can modify (e.g., in real time and/or on-the-fly modify) the presentation during the digital learning environment, which can be performed manually, automatically, and/or automatedly. The modification may include the addition and/or subtraction of one or more operations and/or materials to the presentation.

In some embodiments, a modification can be triggered by and/or result from one or more happenings during the digital learning environment. A happening may include any suitable action, behavior, event, and/or occurrence, etc. that can happen during a digital learning environment. Example happenings can include, but are not limited to, a discussion (e.g., a topic), a question, one or more actions of one or more attendees and/or the moderator, a visual trigger (e.g., a picture, photo, video, data/information, etc.), an auditory trigger (e.g., a word, sound, etc.), use of a resource (e.g., a website, a publication, etc.), and/or reference to a resource, etc., among other actions, behaviors, events, and/or occurrences that are possible and contemplated herein.

Referring back to FIG. 5A, a processor 514 may include any suitable non-volatile/persistent hardware and/or software configured to perform and/or facilitate performing processing functions and/or operations. In various embodiments, the processor 514 includes hardware and/or software for executing instructions in one or more modules and/or applications that can perform and/or facilitate performing functions and/or operations for a digital learning environment. The modules and/or applications executed by the processor 514 can be stored on and executed from a memory device 512 and/or from the processor 514.

Figure 7:
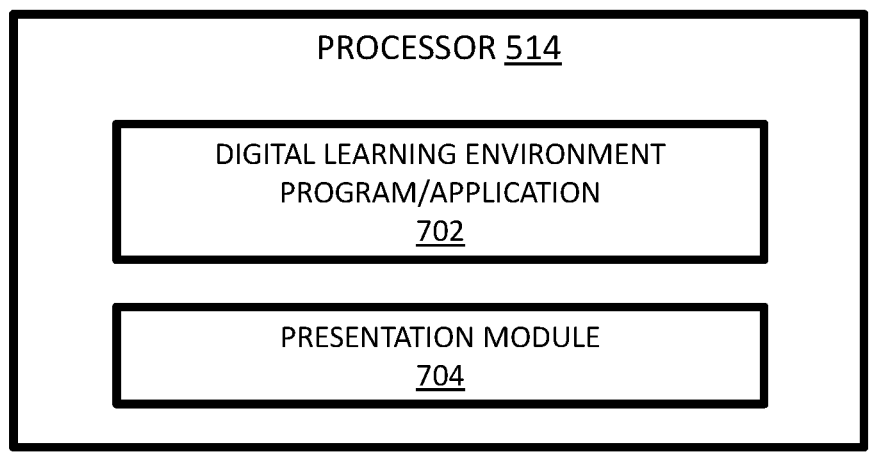
FIG. 7 is a schematic block diagram of one embodiment of a processor included in the moderator computing devices of FIGS. 5A and 5B.

With reference to FIG. 7, FIG. 7 is a schematic block diagram of one embodiment of a processor 514. At least in the illustrated embodiment, the processor 514 includes, among other components, a digital learning environment program and/or application 702 and a presentation module 704 similar to the digital learning environment program and/or application 602 and presentation module 604 discussed with reference to FIG. 6.

Figure 5B:
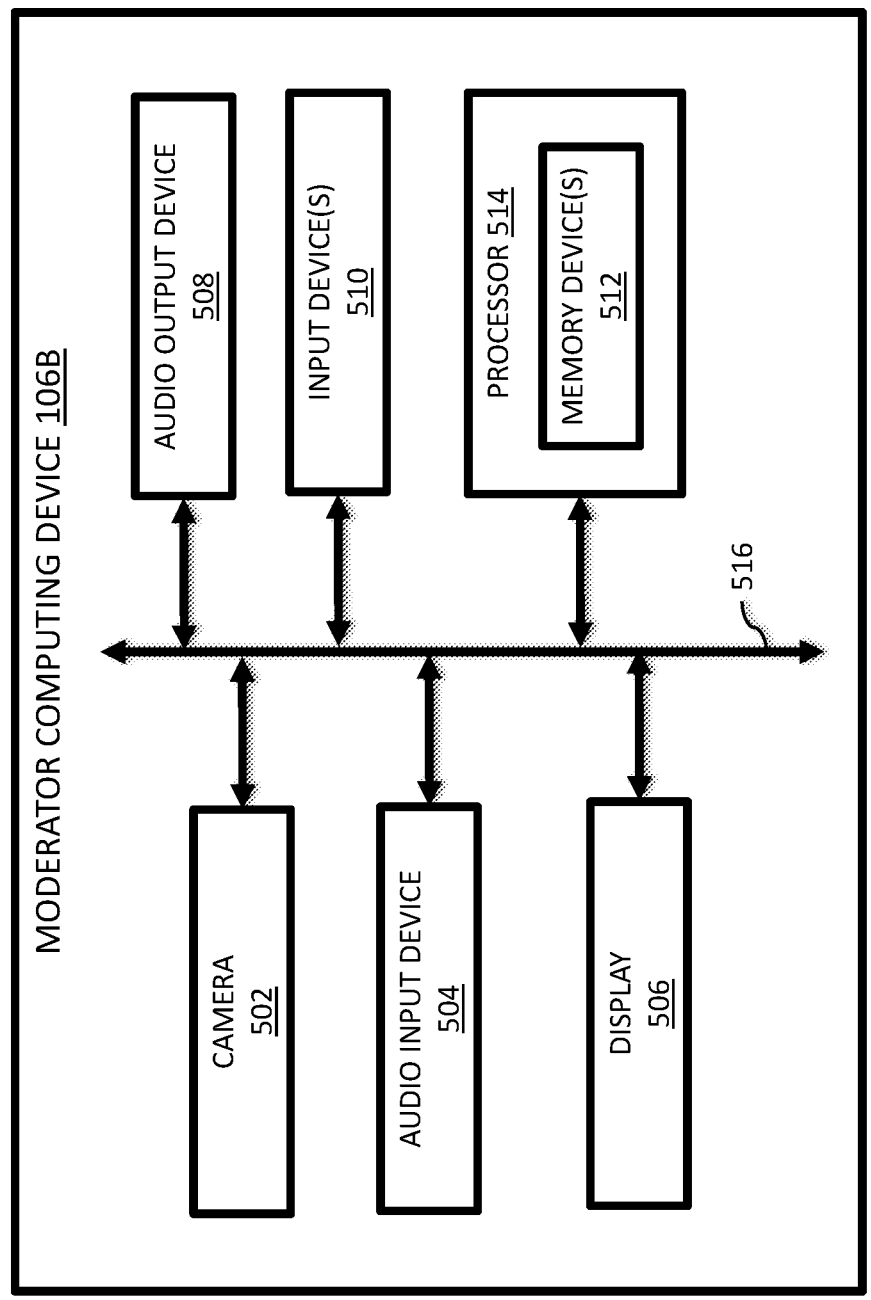

Referring to FIG. 5B, FIG. 5B is a block diagram of another embodiment of a moderator computing device 106B. The moderator computing device 106B includes, among other components, a camera 502, an audio input device 504, a display 506, an audio output device 508, one or more input devices 510, one or more memory devices 512, and a processor 514 coupled to and/or in communication with one another via a bus 516, similar to the camera 502, audio input device 504, display 506, audio output device 508, input device(s) 510, memory device(s) 512, processor 514, and bus 516 discussed with reference to the moderator computing device 106A illustrated in FIG. 5A. Alternative to the moderator computing device 106A, the processor 514 in the moderator computing device 106B includes the memory device(s) 512 as opposed to the memory device(s) 512 of the moderator computing device 106A being a different device than and/or independent of the processor 514.

Referring again to FIG. 1, a host 108 may include any suitable computer hardware and/or software that can replicate a digital learning environment (e.g., a virtual classroom, virtual meeting, etc.), which can also include any suitable digital environment. In various embodiments, the host 108 includes computer hardware and/or software that can manually, automatedly (e.g., without human and/or user input and/or intervention), and/or automatically (e.g., without human and/or user input and/or intervention) replicate a digital learning environment.

A host 108, in various embodiments, can include one or more processors, computer-readable memory, and/or one or more interfaces, among other features and/or hardware. A host 108 can further include any suitable software component or module, or computing device(s) that is/are capable of hosting and/or serving a software application or services, including distributed, enterprise, and/or cloud-based software applications, data, and services. For instance, a host 108 can be configured to host, serve, or otherwise manage digital environments, digital learning environments, or applications interfacing, coordinating with, or dependent on or used by other services, including digital learning environment applications and software tools for a digital learning environment. In some instances, a host 108 can be implemented as some combination of devices that can comprise a common computing system and/or device, server, server pool, or cloud computing environment and share computing resources, including shared memory, processors, and interfaces.

Figure 8A:
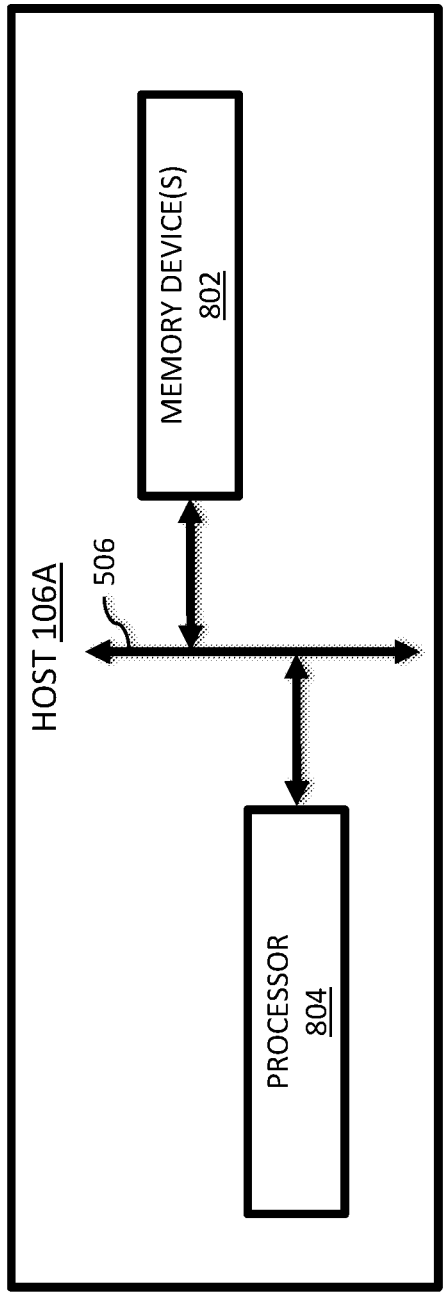
FIGS. 8A and 8B are schematic block diagrams of various embodiments of a host computing device included in the computing system of FIG. 1.

Referring to FIG. 8A, FIG. 8A is a block diagram of one embodiment of a host 108A. At least in the illustrated embodiment, the host 108A includes, among other components, a set of one or more memory devices 802 and a processor 804 coupled to and/or in communication with one another via a bus 806 (e.g., a wired and/or wireless bus).

A set of memory devices 802 may include any suitable quantity of memory devices 802. Further, a memory device 802 may include any suitable type of device and/or system that is known or developed in the future that can store computer-useable and/or computer-readable code. In various embodiments, a memory device 802 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 804).

A memory device 802, in some embodiments, includes volatile computer storage media. For example, a memory device 802 may include RAM, including DRAM, SDRAM, and/or SRAM. In other embodiments, a memory device 802 includes non-volatile computer storage media. For example, a memory device 802 may include a hard disk drive, a flash memory, and/or any other suitable non-volatile computer storage device that is known or developed in the future. In various embodiments, a memory device 802 includes both volatile and non-volatile computer storage media.

Figure 9A:
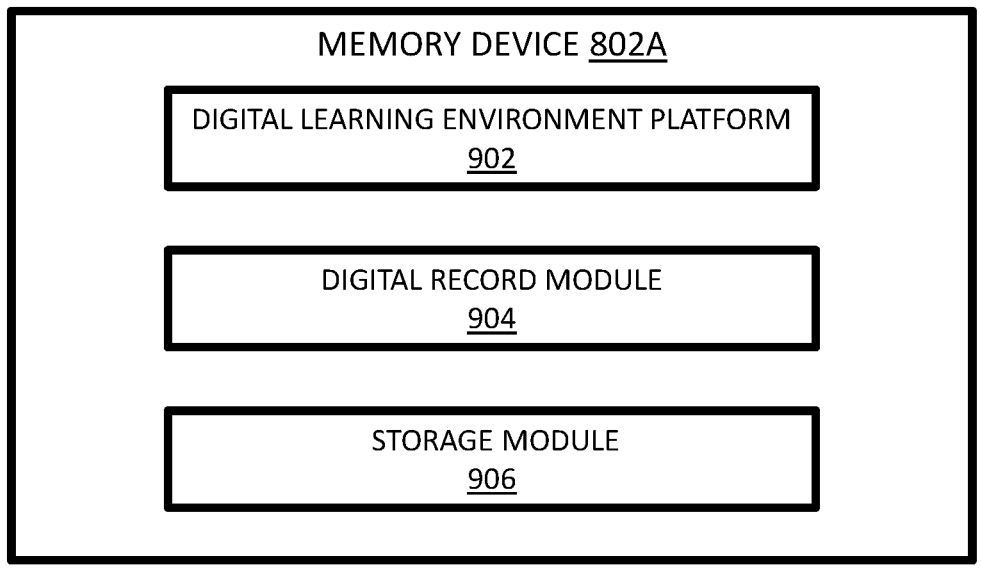
FIGS. 9A and 9B are schematic block diagrams of various embodiments of a memory device included in the host computing devices of FIGS. 8A and 8B.

With reference now to FIG. 9A, FIG. 9A is a schematic block diagram of one embodiment of a memory device 802A. At least in the illustrated embodiment, the memory device 802A includes, among other components, a digital learning environment platform 902, a digital record module 904, and a storage module 906, that are each configured to operate/function in conjunction with one another when executed by the processor 804 to replicate and/or facilitate replicating a digital learning environment.

A digital learning environment platform 902 may include any suitable commercial, private, and/or enterprise digital learning environment program and/or application that is known or developed in the future. In various embodiments, a digital learning environment platform 902 is configured to transmit the various operations performed and the video feeds and/or video streams generated by the moderator computing device 106 and/or the attendee computing device(s) 104 between the moderator computing device 106 and each attendee computing device 104.

The various operations performed in and/or during a digital learning environment can include any suitable operation or set of operations that is/are known or developed in the future capable of being performed in a digital learning environment. The operation(s) can be performed by the moderator computing device 106 and/or one or more attendee computing devices 104.

The video feed and/or video stream generated by each attendee computing device 104 (e.g., a source computing device) and the moderator computing device 106 can include audio and/or video of its user (e.g., attendee or moderator) and/or written/digital messages input by the attendee or moderator. The audio, video, and/or messages of each user of an attendee computing device 104 or moderator computing device 106 can represent and/or convey the behavior(s) of the user (e.g., a student, worker, colleague, peer, etc.) of an attendee computing device 104 or the user (e.g., instructor, teacher, supervisor, peer, presenter, etc.) of a moderator computing device 106 and/or the interaction(s) between the attendee(s) and the moderator.

In various embodiments, the various operations and/or the video feeds and/or video streams generated and/or received by the moderator computing device 106 and/or the attendee computing device(s) 104 can define a digital learning environment and/or digital environment. In certain embodiments, the timing, order, sequence, and/or sequential order of the various operations performed in a presentation, the happenings occurring in each video feed and/or each video stream generated and/or received by the moderator computing device 106 and each attendee computing device(s) 104 can define a digital learning environment and/or digital environment. For example, the happenings and/or operations performed and/or occurring during a session and/or presentation and the respective timings of each, as a whole, can define a digital learning environment and/or digital environment.

A digital record module 904 may include any suitable hardware and/or software that can record and/or facilitate recording a digital learning environment. The digital record module 904 can record and/or facilitate recording a digital learning environment (or digital environment) using any suitable hardware, software, technique, method, and/or process that is known or developed in the future capable of doing such.

In various embodiments, the digital record module 904 is configured to monitor a digital learning environment. In some embodiments, the digital record module 904 is configured to monitor (e.g., in real time) a digital learning environment, which can determine and/or identify the operation(s) performed, happening(s) that occurred, and/or the presentation(s)/lesson(s) provided during a period of time that can define and/or constitute a digital learning environment. In certain embodiments, all or substantially all of the operation(s) performed, happening(s) that occurred, and/or the presentation(s)/lesson(s) provided during a period of time that can define and/or constitute a digital learning environment are monitored.

In additional or alternative embodiments, the digital record module 904 is configured to record and/or generate a digital record of a digital learning environment, which can be used to replicate and/or re-create the digital learning environment at a subsequent and/or future time. In certain embodiments, the digital record of a digital learning environment is based on and/or is generated from the monitored operation(s) performed, happening(s) that occurred, and/or the presentation(s)/lesson(s) provided during a period of time that can define and/or constitute a digital learning environment.

For example, the digital record of a digital learning environment is a record of the operation(s) performed, happening(s) that occurred, and/or the presentation(s)/lesson(s) provided during a digital learning environment. That is, the operation(s) performed, happening(s) that occurred, and/or the presentation(s)/lesson(s) provided during a digital learning environment are recorded in the order and manner in which they occurred during the digital learning environment, which can be considered the original digital learning environment. In other words, the operation(s) performed, happening(s) that occurred, and/or the presentation(s)/lesson(s) provided during an original digital learning environment are intertwined with one another to subsequently replicate and/or re-create the digital learning environment at a future time. Stated differently, the digital record of a digital learning environment includes all of the functions, operations, and interactions/combinations of such in addition to the audiovisual data for the digital learning environment. Thus, the digital record can provide an exact copy and/or substantial exact copy of the digital learning environment.

In reference to the above non-limiting example of the lesson plan, if during the digital learning environment during which the lesson plan is presented, the following elements occurred: 1) a blank screen is turned ON for each attendee computing device 104; 2) the amount of time is waited; 3) the blank screen for each attendee computing device 104 is turned OFF; 4) operations are performed (e.g., click(s)) for website pushing to each attendee computing device 104 (e.g., specifying and submitting the web address or Uniform Resource Locator (URL) of a particular pushed website, performing (e.g., click) web limiting configuration options for the website, switching the web limiting configuration options to "Allow Only", adding the particular website to a list of websites, ensuring that the particular website is active, and turning OFF the other websites in the list of websites); 5) web limiting functions/operations are turned ON; 6) lecture and/or open discussion occurs; 7) instructions and/or information are generated (e.g., type (e.g., (chat, text, etc.), and/or verbal) and transmitted to attendee computing device(s) 104; 8) a student asks a question; 9) the teacher answers the question; 10) the teacher provides an additional resource; 11) the amount of time is waited; and 12) web limiting is turned OFF. Here, while the lesson plan is intended to include nine (9) elements, the digital record will include all twelve (12) elements so that the digital learning environment is recorded for future replication/re-creation in its entirety. Accordingly, an individual can experience, in the future, the exact or substantially the exact digital learning environment as those that were present for the original digital learning environment.

Various embodiments of the digital record can provide the digital learning environment from a pre-determined and/or pre-defined perspective. In some embodiments, the digital record of a digital learning environment is generated from the perspective of an attendee computing device 104. That is, the digital record is a record of the operation(s) performed, happening(s) that occurred, and/or the presentation(s)/lesson(s) from an attendee's perspective (e.g., a student's perspective, a participant's perspective, a colleague's perspective, a worker's perspective, a peer's perspective, etc.).

In additional or alternative embodiments, the digital record of a digital learning environment is generated from the perspective of the moderator computing device 106. That is, the digital record is a record of the operation(s) performed, happening(s) that occurred, and/or the presentation(s)/lesson(s) from the moderator's perspective (e.g., a teacher's perspective, an instructor's perspective, a boss's perspective, a supervisor's perspective, a peer's perspective, etc.).

In further additional or alternative embodiments, the digital record of a digital learning environment is generated from the perspective of a third party and/or non-participant. For example, the digital record is a record of the operation(s) performed, happening(s) that occurred, and/or the presentation(s)/lesson(s) from a generic perspective.

A digital record of a digital learning environment may include any suitable type of digital record that is known or developed in the future. Further, the digital record may be generated using any suitable code, technique, algorithm, and/or method that is known or developed in the future capable of generating a digital record of a digital learning environment. For example, the digital record module 904 can generate data and/or information representing operation(s) performed, happening(s) that occurred, and/or the presentation(s)/lesson(s) provided during a digital learning environment.

Further, the digital record may include any suitable code and/or type of code that is known or developed in the future capable of generating a digital record of a digital learning environment. In various embodiments, the digital record module 904 is configured to transmit the digital record to the storage module 906 for processing thereon.

A storage module 906 may include any suitable hardware and/or software that can store a digital record a digital learning environment. The storage module 906 may store a digital record a digital learning environment using any suitable code, technique, algorithm, and/or method that is known or developed in the future capable of storing a digital record of a digital learning environment for subsequent retrieval and/or use.

In various embodiments, the storage module 906 is configured to permanently store the digital record of a digital learning environment. In other embodiments, the storage module 906 is configured to temporarily store the digital record of a digital learning environment.

Temporary storage can include storage for any suitable amount of time and/or quantity of retrievals (in general and/or by one or more specific and/or particular users), among other factors and/or criteria that are possible and contemplated herein. In some embodiments, the storage module 906 is configured to automatically and/or automatedly delete, erase, and/or remove the digital record in response to the time, factor(s), and/or criteria for temporary storage expiring and/or being satisfied. In additional or alternative embodiments, the storage module 906 is configured to prompt a user to delete, erase, and/or remove the digital record in response to the time, factor(s), and/or criteria for temporary storage expiring and/or being satisfied. In some embodiments, the storage module 906 is configured to query a user to increase temporary storage of the digital record in response to the time, factor(s), and/or criteria for temporary storage expiring and/or being satisfied.

Figure 9B:
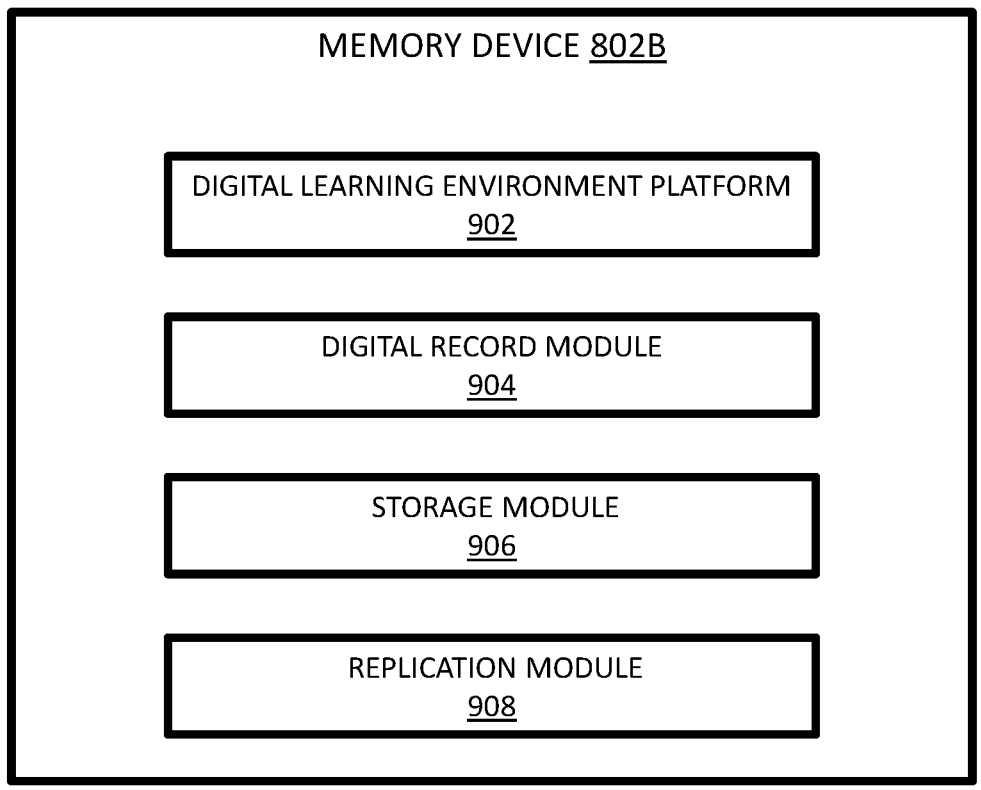

Referring now to FIG. 9B, FIG. 9B is a block diagram of another embodiment of a memory device 802B. The memory device 802B includes a digital learning environment platform 902, a digital record module 904, and a storage module 906 similar to the digital learning environment platform 902, the digital record module 904, and storage module 906, respectively, included in the memory device 802A discussed elsewhere herein. At least in the illustrated embodiment, the memory device 802B further includes, among other components, a replication module 908 configured to operate/function in conjunction with the digital record module 904 and the storage module 906 when executed by the processor 804 to replicate a digital learning environment and/or facilitate replicating a digital learning environment.

A replication module 908 may include any suitable hardware and/or software that can replicate and/or re-create a digital learning environment and/or facilitate replicating and/or re-creating a digital learning environment. In various embodiments, the replication module 908 is configured to utilize a digital record of a digital learning environment to replicate and/or re-create the digital learning environment and/or facilitate replicating and/or re-creating the digital learning environment.

The replication module 908, in various embodiments, is configured to replicate and/or re-create the digital learning environment by replaying the digital learning environment. The digital learning environment can be replayed on any suitable computing device that is known or developed in the future (e.g., an attendee computing device 104, a moderator computing device 106, etc.).

In certain embodiments, the replication module 908, is configured to replicate and/or re-create the digital learning environment for a targeted user and/or class of users. For example, the replication module 908 can replicate and/or re-create the digital learning environment by replaying the digital learning environment to a user that originally participated/attended the original digital learning environment, a user that was absent or U did not attend/participate in the original digital learning environment, and/or the moderator of the original digital learning environment, among other users that are possible and contemplated herein.

The ability to exactly or substantially exactly replicate and/or re-create a digital learning environment at a subsequent time and/or in the future can provide a time shift for the digital learning environment. That is, at least some users are allowed to and/or able to experience a digital learning environment at a future time as though they were actually in attendance because the digital record can provide a duplicated digital learning environment. Thus, some users are able to feel that they are experiencing the same digital environment (situational, operational, and instructional) as those users that were in live attendance of the digital learning environment, even though they were not actually present during the original digital learning environment. In other words, the various embodiments enable and/or allow a user to perceive that they are in actual attendance of the digital learning environment when, in fact, the digital learning environment has already occurred in the past. Similarly, those users that were in actual attendance of the original digital learning environment can feel as though they are duplicating the experience of the digital learning environment at a later time/date.

Referring back to FIG. 8A, a processor 804 may include any suitable non-volatile/persistent hardware and/or software configured to perform and/or facilitate performing functions and/or operations for monitoring the behavior of attendees of a digital learning environment. In various embodiments, the processor 804 includes hardware and/or software for executing instructions in one or more modules and/or applications that can perform and/or facilitate performing functions and/or operations for replicating a digital learning environment. The modules and/or applications executed by the processor 804 for performing and/or facilitate performing functions and/or operations to replicate a digital learning environment can be stored on and executed from a memory device 802 and/or from the processor 804.

Figure 10A:
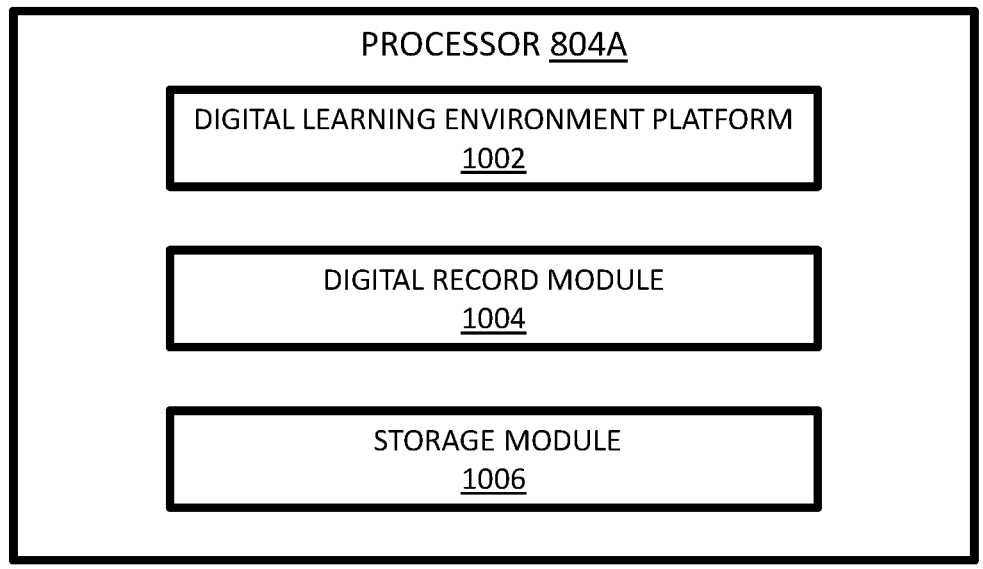
FIGS. 10A and 10B are schematic block diagrams of various embodiments of a processor included in the host computing devices of FIGS. 8A and 8B.

With reference to FIG. 10A, FIG. 10A is a schematic block diagram of one embodiment of a processor 804A. At least in the illustrated embodiment, the processor 804A includes, among other components, a digital learning environment platform 1002, a digital record module 1004, and a storage module 1006 similar to the digital learning environment platform 902, digital record module 904, and storage module 906 in the memory device 802A discussed with reference to FIG. 9A.

Figure 10B:
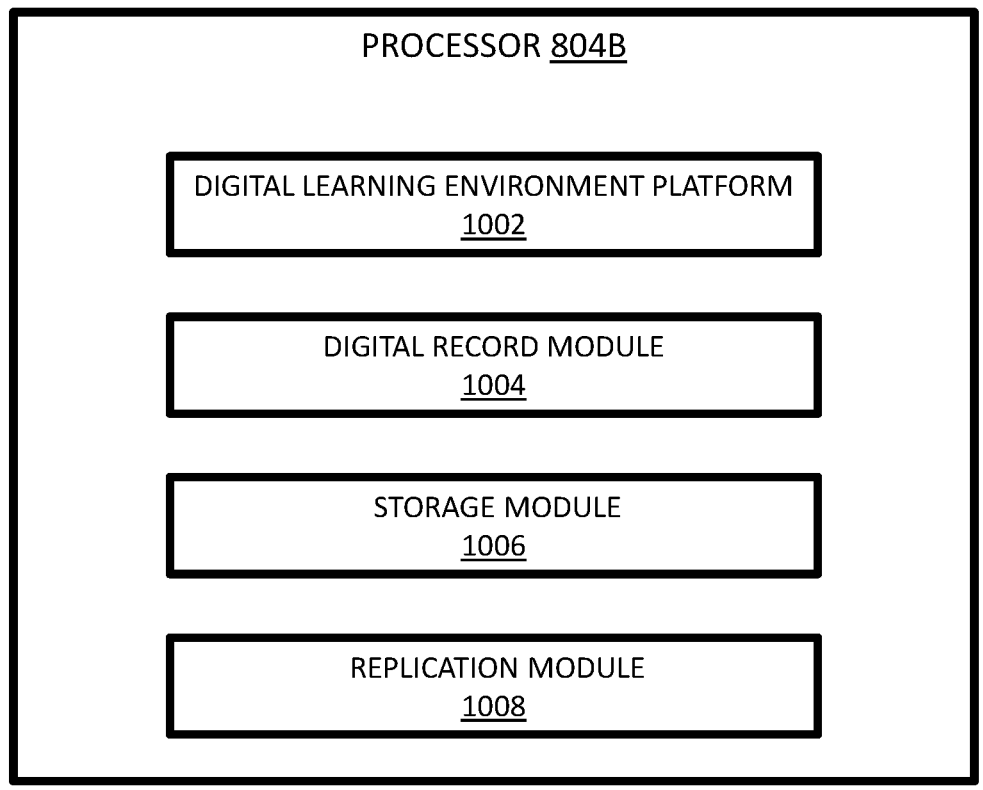

Referring to FIG. 10B, FIG. 10B is a schematic block diagram of another embodiment of a processor 804B. At least in the illustrated embodiment, the processor 804B includes, among other components, a digital learning environment platform 1002, a digital record module 1004, a storage module 1006, and a replication module 1008 similar to the digital learning environment platform 902, digital record module 904, storage module 906, and replication module 908 in the memory device 802B discussed with reference to FIG. 9B.

Figure 8B:
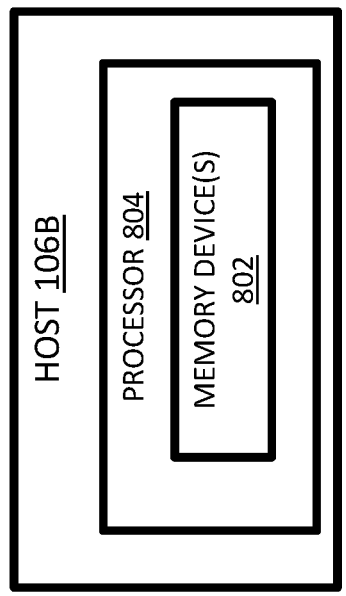

Turning now to FIG. 8B, FIG. 8B is a block diagram of another embodiment of a host 108B. The host 108B includes, among other components, a memory 802 and a processor 804. Alternative to the host 108A, the processor 804 in the host 108B includes the memory device 802 as opposed to the memory device 802 of the host 108A being a different device than and/or independent of the processor 804.

Figure 11:
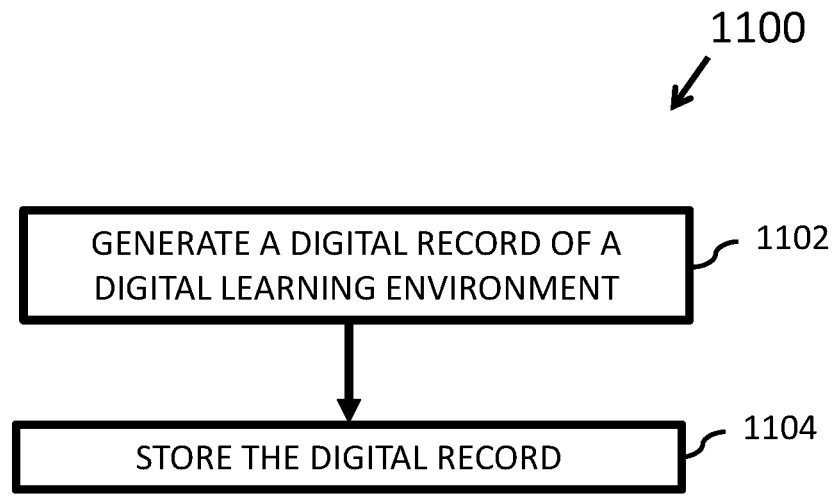
FIGS. 11 and 12 are flow diagrams of various embodiments of a method for replicating a digital learning environment.

FIG. 11 is a schematic flow chart diagram illustrating one embodiment of a method 1100 for replicating a digital learning environment. At least in the illustrated embodiment, the method 1100 begins by a processor (e.g., processor 804) generating a digital record of a digital learning environment (block 1102).

The digital record may include any suitable digital record and/or digital learning environment, as discussed elsewhere herein. Further, the digital learning environment may include any suitable operations, happenings, presentation, lesson, and/or lesson plan, as discussed elsewhere herein.

The processor 804 can store the digital record for the digital learning environment (block 1104). The digital record can be stored using any suitable method, technique, and/or process than can store the digital record of a digital learning environment, as discussed elsewhere herein.

Figure 12:
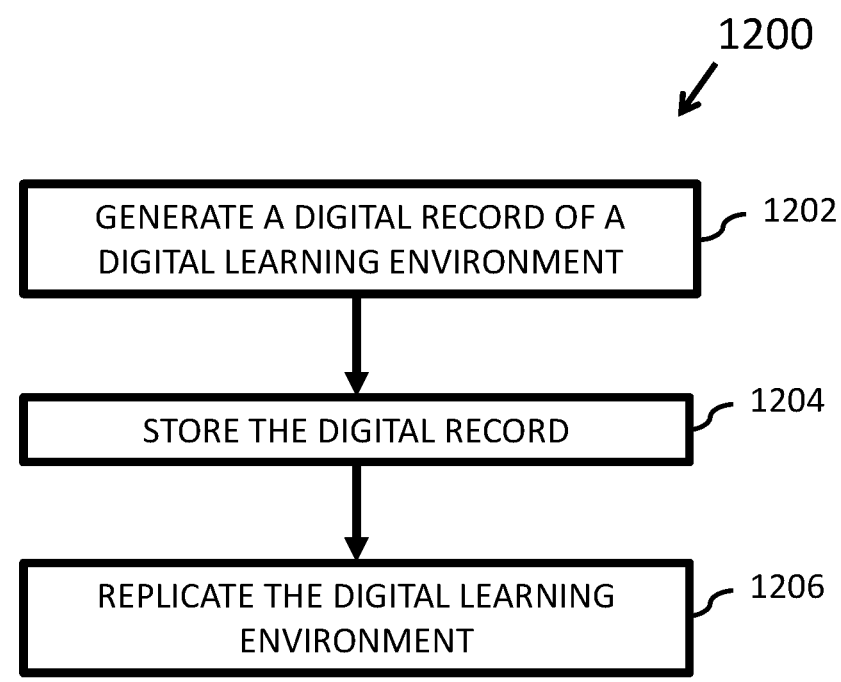

FIG. 12 is a schematic flow chart diagram illustrating another embodiment of a method 1200 for replicating a digital learning environment. At least in the illustrated embodiment, the method 1200 begins by a processor (e.g., processor 804) generating a digital record of a digital learning environment (block 1202).

The digital record may include any suitable digital record and/or digital learning environment, as discussed elsewhere herein. Further, the digital learning environment may include any suitable operations, happenings, presentation, lesson, and/or lesson plan, as discussed elsewhere herein.

The processor 804 can store the digital record for the digital learning environment (block 1204). The digital record can be stored using any suitable method, technique, and/or process than can store the digital record of a digital learning environment, as discussed elsewhere herein.

At a subsequent time, the processor 804 replicates the digital learning environment (block 1206). In some embodiments, replicating the digital learning environment includes replaying the digital learning environment.

The processor 804 can use the digital record to replicate the digital learning environment, as discussed elsewhere herein. Further, the digital learning environment can be replicated to a target user or class of target users, as further discussed herein. In addition, the digital learning environment can be replicated to a user that originally attended/participated in the original digital learning environment or to a user that did not originally attend/participate in the original digital learning environment, as discussed herein.

While the various embodiments discussed herein are referenced as and/or related to a, digital learning environment, the various embodiments are not limited to a digital learning environment. That is, the various embodiments contemplate and include any suitable digital environment.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
   a processor; and
   a memory configured to store code executable by the processor to:
      generate a digital record of a digital environment occurring at an original time, the digital record comprising a set of happenings that occurred in the digital environment at the original time, and
      store the digital record for replication of the digital environment,
   wherein:
      the digital record of the digital environment stores a set of operations performed in the digital environment, a set of events that occurred in the digital environment, and content presented during the digital environment,
      the set of operations performed in the digital environment, the set of events that occurred in the digital environment, and the content presented during the digital environment are preserved in an order in which the set of operations were performed, the set of events occurred, and the content was presented, and
      the order intertwines the set of operations, the set of events, and the content as presented during the digital environment to replicate the digital environment.

2. The apparatus of claim 1, wherein the code is further executable by the processor to replay the digital record at one or more subsequent times relative to the original time to replicate the digital environment at the one or more subsequent times.

3. The apparatus of claim 2, wherein replaying the digital record comprises replaying the digital record at the one or more subsequent times for at least one of a first user that originally participated in the digital environment and a second user that did not originally participate in the digital environment.

4. The apparatus of claim 1, wherein the digital environment includes a predetermined perspective.

5. The apparatus of claim 1, wherein the digital environment comprises a virtual presentation.

6. The apparatus of claim 1, wherein the digital environment comprises a virtual classroom.

7. A method, comprising:
  generating, by a processor, a digital record of a digital environment occurring at an original time, the digital record comprising a set of happenings that occurred in the digital environment at the original time; and
  storing the digital record for replication of the digital environment,
  wherein:
    the digital record of the digital environment stores a set of operations performed in the digital environment, a set of events that occurred in the digital environment, and content presented during the digital environment,
    the set of operations performed in the digital environment, the set of events that occurred in the digital environment, and the content presented during the digital environment are preserved in an order in which the set of operations were performed, the set of events occurred, and the content was presented, and
    the order intertwines the set of operations, the set of events, and the content as presented during the digital environment to replicate the digital environment.

8. The method of claim 7, wherein the method further comprises replaying the digital record at one or more subsequent times relative to the original time to replicate the digital environment at the one or more subsequent times.

9. The method of claim 8, wherein replaying the digital record comprises replaying the digital record at the one or more subsequent times for at least one of a first user that originally participated in the digital environment and a second user that did not originally participate in the digital environment.

10. The method of claim 7, wherein the digital environment comprises a virtual presentation.

11. The method of claim 7, wherein the digital environment comprises a virtual classroom.

12. The method of claim 7, wherein the digital environment includes a predetermined perspective.

13. The method of claim 7, wherein the order intertwines the set of operations, the set of events, and the content as presented during the digital environment.

14. A computer program product comprising a computer-readable storage device including code embodied therewith, the code executable by a processor to cause the processor to:
  generate a digital record of a digital environment occurring at an original time, the digital record comprising a set of happenings that occurred in the digital environment at the original time; and
  store the digital record for replication of the digital environment,
  wherein:
    the digital record of the digital environment stores a set of operations performed in the digital environment, a set of events that occurred in the digital environment, and content presented during the digital environment,
    the set of operations performed in the digital environment, the set of events that occurred in the digital environment, and the content presented during the digital environment are preserved in an order in which the set of operations were performed, the set of events occurred, and the content was presented, and
    the order intertwines the set of operations, the set of events, and the content as presented during the digital environment to replicate the digital environment.

15. The computer program product of claim 14, wherein the code is further executable by the processor to cause the processor to replay the digital record at one or more subsequent times relative to the original time to replicate the digital environment at the one or more subsequent times.

16. The computer program product of claim 15, wherein replaying the digital record comprises replaying the digital record at the one or more subsequent times for at least one of a first user that originally participated in the digital environment and a second user that did not originally participate in the digital environment.

17. The computer program product of claim 14, wherein the digital environment comprises a virtual presentation.

18. The computer program product of claim 14, wherein the digital environment includes a predetermined perspective.

19. The computer program product of claim 14, wherein the order intertwines the set of operations, the set of events, and the content as presented during the digital environment.

20. The computer program product of claim 14, wherein the digital environment comprises a virtual classroom.

* * * * *